United States Patent
Ahn et al.

(10) Patent No.: US 8,879,235 B2
(45) Date of Patent: Nov. 4, 2014

(54) MULTILAYERED CERAMIC CAPACITOR AND MOUNTING STRUCTURE OF CIRCUIT BOARD HAVING MULTILAYERED CERAMIC CAPACITOR MOUNTED THEREON

(71) Applicant: Samsung Electro-Mechanics, Co., Ltd., Gyunggi-do (KR)

(72) Inventors: Young Ghyu Ahn, Gyunggi-do (KR); Heung Kil Park, Gyunggi-do (KR); Doo Young Kim, Gyunggi-do (KR); Sang Soo Park, Gyunggi-do (KR); Min Cheol Park, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 86 days.

(21) Appl. No.: 13/770,962

(22) Filed: Feb. 19, 2013

(65) Prior Publication Data
US 2014/0144687 A1    May 29, 2014

(30) Foreign Application Priority Data
Nov. 29, 2012   (KR) .......................... 10-2012-0136771

(51) Int. Cl.
*H01G 4/30*     (2006.01)
*H01G 4/005*    (2006.01)
*H01G 4/06*     (2006.01)
*H01G 4/12*     (2006.01)
*H05K 1/16*     (2006.01)

(52) U.S. Cl.
CPC ................. *H01G 4/30* (2013.01); *H01G 4/005* (2013.01); *H01G 4/12* (2013.01); *H05K 1/162* (2013.01)

USPC .......................... 361/301.4; 361/303; 361/311

(58) Field of Classification Search
CPC .................................. H01G 4/30; H01G 4/005
USPC ................................ 361/301.4, 303, 305, 311
See application file for complete search history.

(56) References Cited

U.S. PATENT DOCUMENTS

| | | | |
|---|---|---|---|
| 6,829,134 B2 * | 12/2004 | Yamauchi et al. | 361/303 |
| 6,972,942 B2 * | 12/2005 | Ritter et al. | 361/306.3 |
| 7,050,288 B2 * | 5/2006 | Ahiko et al. | 361/303 |
| 7,152,291 B2 * | 12/2006 | Ritter et al. | 29/25.42 |
| 7,161,794 B2 * | 1/2007 | Galvagni et al. | 361/309 |
| 7,170,737 B2 * | 1/2007 | MacNeal et al. | 361/306.3 |
| 2007/0121275 A1 | 5/2007 | Takashima et al. | |

FOREIGN PATENT DOCUMENTS

JP        2007-235170 A       9/2007

* cited by examiner

*Primary Examiner* — Eric Thomas
(74) *Attorney, Agent, or Firm* — McDermott Will & Emery LLP

(57) ABSTRACT

There is provided a multilayered ceramic capacitor, including a ceramic body, an active layer including a plurality of first and second internal electrodes alternately exposed through both end surfaces of the ceramic body while having the dielectric layer therebetween, to form capacitance; upper and lower cover layers formed above and below the active layer; first and second external electrodes covering both end surfaces of the ceramic body; a plurality of first and second dummy electrodes extended from the first and second external electrodes; and a plurality of piezoelectric members connecting the first internal electrode and the first dummy electrode or the second internal electrode and the second dummy electrode, inside the active layer, the piezoelectric members having a higher dielectric constant than the dielectric layer.

15 Claims, 9 Drawing Sheets

US 8,879,235 B2

MULTILAYERED CERAMIC CAPACITOR AND MOUNTING STRUCTURE OF CIRCUIT BOARD HAVING MULTILAYERED CERAMIC CAPACITOR MOUNTED THEREON

CROSS-REFERENCE TO RELATED APPLICATIONS

This application claims the priority of Korean Patent Application No. 10-2012-0136771 filed on Nov. 29, 2012, in the Korean Intellectual Property Office, the disclosure of which is incorporated herein by reference.

BACKGROUND OF THE INVENTION

1. Field of the Invention

The present invention relates to a multilayered ceramic capacitor and a mounting structure of a circuit board having a multilayered ceramic capacitor mounted thereon.

2. Description of the Related Art

A multilayered ceramic capacitor, a type of multilayered electronic chip component, is a chip type condenser mounted on printed circuit boards of various electronic products, such as, image devices including a liquid crystal display (LCD) and a plasma display panel (PDP), a computer, a personal digital assistant (PDA), a mobile phone, and the like and implementing charging or discharging of electricity therein.

A multilayered ceramic capacitor (MLCC) may be used as components in various electronic products due to the advantages of compactness, high capacitance, and ease of mounting.

A multilayered ceramic capacitor may have a structure in which a plurality of dielectric layers and a plurality of internal electrodes having different polarities, disposed between the dielectric layers, are alternately laminated with each other.

Since dielectric layers have piezoelectric properties and electrostrictive properties, a piezoelectric phenomenon may occur, thus causing vibrations among the internal electrodes when alternating current (AC) or direct current (DC) voltage is applied to the multilayered ceramic capacitor.

Such vibrations are transferred to a printed circuit board on which the multilayered ceramic capacitor is mounted, through external electrodes of the multilayered ceramic capacitor, and the entire printed circuit board becomes an acoustic reflection surface to generate vibration sound as noise.

The vibration sound may be within an audible frequency range of 20 to 20000 Hz, and this vibration sound may give an unpleasant feeling to listeners and is known as acoustic noise.

In order to reduce acoustic noise, studies have been made on the mounting direction in which internal electrodes formed in the multilayered ceramic capacitor are mounted on a printed circuit board.

More specifically, acoustic noise is further reduced when the multilayered ceramic capacitor is mounted on a printed circuit board such that internal electrodes have directivity perpendicular with respect to the printed circuit board than in the case in which the multilayered ceramic capacitor is mounted on the printed circuit board such that the internal electrodes have directivity horizontal with respect with the printed circuit board.

However, even though the acoustic noise is measured by mounting the multilayered ceramic capacitor on the printed circuit board such that the internal electrodes have directivity perpendicular with respect to the printed circuit board, the noise has a predetermined level. Therefore, new measures of reducing acoustic noise are required.

SUMMARY OF THE INVENTION

An aspect of the present invention provides new measures capable of reducing noise generated due to vibrations caused by a piezoelectric phenomenon in a multilayered ceramic capacitor when a multilayered ceramic capacitor is mounted on a printed circuit board.

According to an aspect of the present invention, there is provided a multilayered ceramic capacitor, including: a ceramic body having a plurality of dielectric layers laminated therein; an active layer including a plurality of first and second internal electrodes alternately exposed through both end surfaces of the ceramic body while having the dielectric layer interposed therebetween, to thereby form capacitance; upper and lower cover layers formed above and below the active layer, respectively; first and second external electrodes covering both end surfaces of the ceramic body; a plurality of first and second dummy electrodes extended from the first and second external electrodes toward an inner portion in a length direction to thereby be opposed to the first and second internal electrodes, respectively, inside the active layer; and a plurality of piezoelectric members connecting the first internal electrode and the first dummy electrode or the second internal electrode and the second dummy electrode, respectively, inside the active layer, the piezoelectric members having a higher dielectric constant than the dielectric layer.

The piezoelectric members may be formed both between the first internal electrode and the first dummy electrode and between the second internal electrode and the second dummy electrode.

The lower cover layer may be thicker than the upper cover layer, and when 1/2 of an overall thickness of the ceramic body is designated as A, a thickness of the lower cover layer is designated as B, 1/2 of an overall thickness of the active layer is designated as C, and a thickness of the upper cover layer is designated as D, a ratio of deviation between a center of the active layer from a center of the ceramic body, (B+C)/A, may satisfy $1.064 \leq (B+C)/A \leq 1.745$.

Here, a ratio of the thickness (D) of the upper cover layer to the thickness (B) of the lower cover layer, D/B, may satisfy $0.021 \leq D/B \leq 0.421$.

Here, a ratio of the thickness (B) of the lower cover layer to 1/2 (A) of the thickness of the ceramic body, B/A, may satisfy $0.220 \leq B/A \leq 1.522$.

Here, a ratio of 1/2 (C) of the overall thickness of the active layer to the thickness (B) of the lower cover layer, C/B, may satisfy $0.147 \leq C/B \leq 3.843$.

The lower cover layer may include dummy patterns, the dummy patterns including first and second dummy patterns extended inwardly from the first and second external electrodes in the length direction to thereby be opposed to each other, respectively.

The first and second dummy patterns may have the same length.

The multilayered ceramic capacitor may further include piezoelectric members connecting the first and second dummy patterns to each other inside the lower cover layer, the piezoelectric members having a higher dielectric constant than the dielectric layer of the lower cover layer.

The lower cover layer may be formed of a material having a higher dielectric constant than that of the dielectric layer of the ceramic body.

Here, a point of inflection formed in both end surfaces of the ceramic body may be formed at a height corresponding to or lower than a center of the thickness of the ceramic body, due to a difference between a deformation rate occurring in a center of the active layer and a deformation rate occurring in the lower cover layer, at the time of an application of voltage.

According to another aspect of the present invention, there is provided a mounting structure of a circuit board having a multilayered ceramic capacitor mounted thereon, the mounting structure including: a printed circuit board having first and second electrode pads formed thereon; and a multilayered ceramic capacitor mounted on the printed circuit board, wherein the multilayered ceramic capacitor includes: a ceramic body having a plurality of dielectric layers laminated therein; an active layer including a plurality of first and second internal electrodes alternately exposed through both end surfaces of the ceramic body while having the dielectric layer interposed therebetween, to thereby form capacitance; an upper cover layer formed above the active layer; a lower cover layer formed below the active layer; first and second external electrodes formed on both end surfaces of the ceramic body while being electrically connected with exposed portions of the first and second internal electrodes and soldering-connected with the first and second electrode pads; a plurality of first and second dummy electrodes extended from the first and second external electrodes toward an inner portion in a length direction to thereby be opposed to the first and second internal electrodes, respectively, inside the active layer; and a plurality of piezoelectric members connecting the first internal electrode and the first dummy electrode or the second internal electrode and the second dummy electrode, respectively, inside the active layer, the piezoelectric members having a higher dielectric constant than the dielectric layer, and wherein, when 1/2 of an overall thickness of the ceramic body is designated as A, a thickness of the lower cover layer is designated as B, 1/2 of an overall thickness of the active layer is designated as C, and a thickness of the upper cover layer is designated as D, a ratio of deviation of a center of the active layer deviating from a center of the ceramic body, $(B+C)/A$, satisfies $1.064 \leq (B+C)/A \leq 1.745$.

Here, a point of inflection formed in both end surfaces of the ceramic body may be formed at a height corresponding to or lower than that of the soldering, due to a difference between a deformation rate occurring in a center of the active layer and a deformation rate occurring in the lower cover layer, at the time of an application of voltage.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
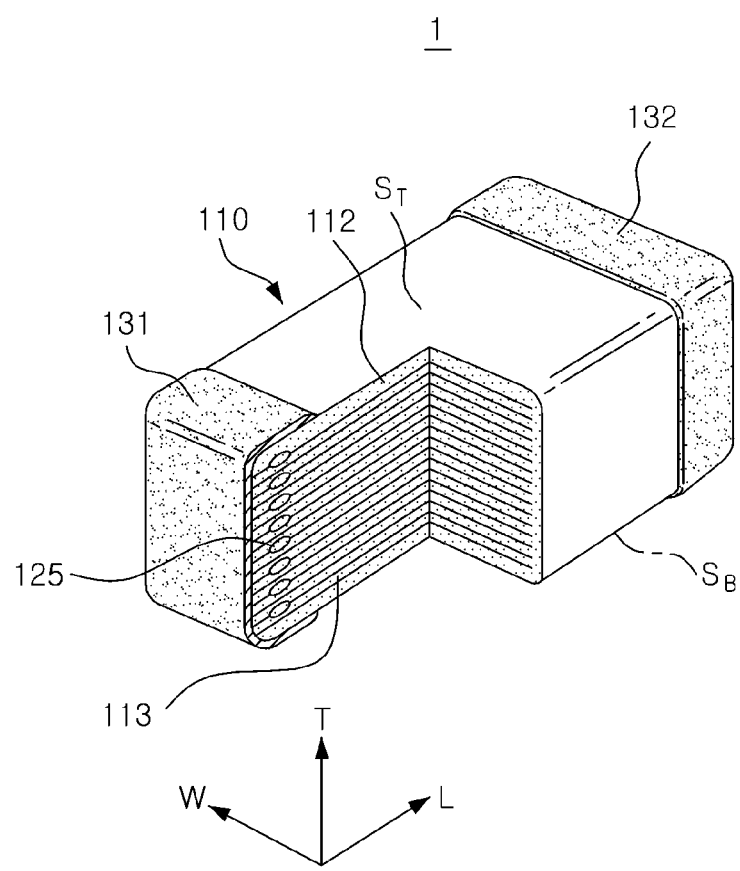
FIG. 1 is a partially cutaway perspective view schematically showing a multilayered ceramic capacitor according to a first embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

When directions of a hexahedron are defined in order to clearly describe embodiments of the present invention, L, W, and T shown in the drawings indicate length, width, and thickness directions, respectively. Here, the thickness direction may be used in the same concept as a lamination direction in which dielectric layers are laminated.

In addition, in the present embodiments, surfaces on which first and second external electrodes are formed in a length direction of a ceramic body are defined as end surfaces, and surfaces vertically intersecting the end surfaces are defined as side surfaces.

Multilayered Ceramic Capacitor

Figure 2:
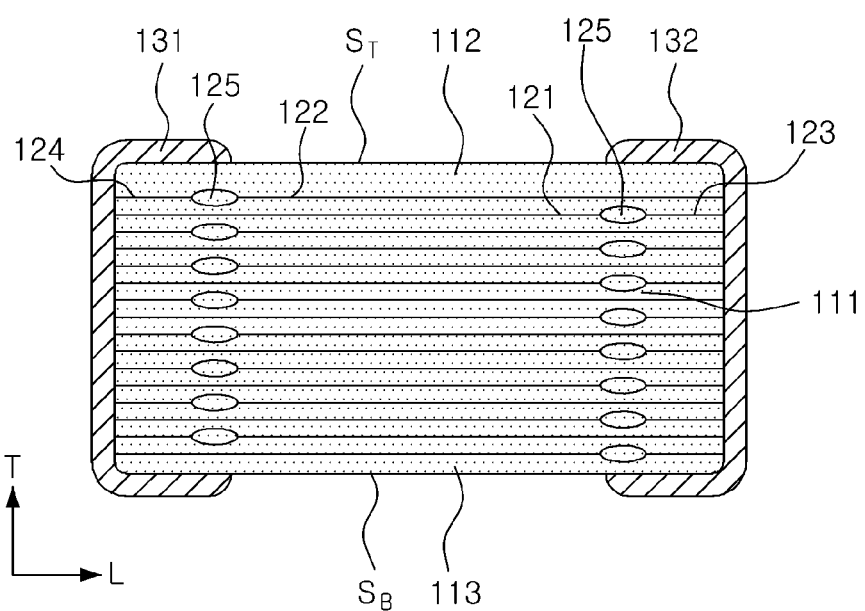
FIG. 2 is a cross-sectional view showing the multilayered ceramic capacitor of FIG. 1, cut in a length direction thereof.

Referring to FIGS. 1 and 2, a multilayered ceramic capacitor 1 according to a first embodiment of the present invention may include a ceramic body 110, an active layer 115 having a plurality of first and second internal electrodes 121 and 122, upper and lower cover layers 112 and 113 respectively formed above and below the active layer 115, and first and second external electrodes 131 and 132 formed to cover both end surfaces of the ceramic body 110.

A plurality of first and second dummy electrodes 123 and 124 may be formed inside the active layer 115 such that they are extended inwardly from the first and second external electrodes 131 and 132 in a length direction to thereby be opposed to the first and second internal electrodes 121 and 122, respectively.

Piezoelectric members 125 are formed inside the active layer 115 so as to connect the first internal electrode 121 and the first dummy electrode 123 or the second internal electrode 122 and the second dummy electrode 124 to each other, respectively.

In the present embodiment, the piezoelectric members 125 having high dielectric constant are formed so as to connect the first internal electrode 121 and the first dummy electrode 123 to each other and the second internal electrode 122 and the second dummy electrode 124 to each other, but the present invention is not limited thereto. The piezoelectric members 125 may be appropriately changed as necessary. For example, the piezoelectric members 125 may connect the first internal electrode 121 and the first dummy electrode 123 to each other while the second internal electrode 122 and the second dummy electrode 124 maintain a gap therebetween, or connect the second internal electrode 122 and the second dummy electrode 124 to each other while the first internal electrode 121 and the first dummy electrode 123 maintain a gap therebetween.

The piezoelectric member 125 may be formed of a material having a higher dielectric constant or higher piezoelectricity than a material constituting the dielectric layer 111.

The ceramic body 110 may be formed by laminating and firing a plurality of dielectric layers 111. The shape, dimension, and number of stacked dielectric layers 111, of the ceramic body 110, are not limited to those described in the present embodiment.

The plurality of dielectric layers 111 constituting the ceramic body 110 are in a sintered state, and boundaries between adjacent dielectric layers 111 may be integrated with each other such that they are difficult to distinguish from each other without a scanning electron microscope (SEM).

The ceramic body 110 may include the active layer 115 contributing to capacitance formation of the capacitor, and the upper and lower cover layers 112 and 113 as upper and lower margin parts, which are formed above and below the active layer 115, respectively.

The active layer 115 may be formed by repeatedly laminating a plurality of first and second internal electrodes 121 and 122 while the dielectric layer 111 is interposed between the first internal electrode and the second internal electrode.

Here, the thickness of the dielectric layer 111 may be optionally changed according to the design of capacitance of the multilayered ceramic capacitor 100, and the thickness of one layer may be 0.01 to 1.00 μm after firing, but the present invention is not limited thereto.

In addition, the dielectric layer 111 may contain ceramic powder having a high dielectric constant, for example, barium titanate ($BaTiO_3$) based powder or strontium titanate ($SrTiO_3$) based powder, but the present invention is not limited thereto.

The first and second internal electrodes 121 and 122 are a pair of electrodes having different polarities, and may be formed by printing a predetermined thickness of conductive paste containing conductive metal on the dielectric layers 111 while the first and second internal electrodes 121 and 122 are alternatively exposed through both end surfaces in a lamination direction of the dielectric layers 111. The first and second internal electrodes 121 and 122 may be electrically insulated from each other by the dielectric layers 111 disposed therebetween.

The first and second internal electrodes 121 and 122 may be electrically connected with the first and second external electrodes 131 and 132 through portions thereof alternatively exposed through both end surfaces of the ceramic body 110.

Therefore, when voltages are applied to the first and second external electrodes 131 and 132, charges are stored between the first and second internal electrodes 121 and 122 facing each other. Here, the capacitance of the multilayered ceramic capacitor 100 is proportional to an area of an overlapping region of the first and second internal electrodes 121 and 122.

The thickness of each of the first and second internal electrodes 121 and 122 may be determined depending on the usage thereof, and for example, may be determined within a range of 0.2 to 1.0 μM in consideration of the size of the ceramic body 110. However, the present invention is not limited thereto.

In addition, conductive metal contained in the conductive paste for forming the first and second internal electrodes 121 and 122 may be nickel (Ni), copper (Cu), palladium (Pd), or an alloy thereof, but the present invention is not limited thereto.

In addition, the conductive paste may be printed by a screen printing method, a gravure printing method, or the like, but the present invention is not limited thereto.

The first and second dummy electrodes 123 and 124 may be positioned on the same plane as the first and second internal electrodes 121 and 122 inside the active layer 115. The first and second dummy electrodes 123 and 124 may be formed by printing a conductive paste containing a conductive metal on the dielectric layers 111 at a predetermined thickness through the same method as the formation of the first and second internal electrodes 121 and 122. Here, the first and second dummy electrodes 123 and 124 may be alternately exposed through an end surface opposite to a surface through which the respective first and second internal electrodes 121 and 122 of the dielectric layers 111 are exposed.

Therefore, the gap between the first internal electrode 121 and the first dummy electrode 123 and the gap between the second internal electrode 122 and the second dummy electrode 124 may be offset in a lamination direction thereof. In the present embodiment, the piezoelectric member 125 may be formed at the respective gaps between the dummy electrodes and the internal electrodes.

When an electric field is applied to a margin part of the multilayered ceramic capacitor in a length direction thereof, the first and second dummy electrodes 123 and 124 expand in the contrary direction to shrinkage in head portions of the first and second external electrodes 131 and 132 in the length direction of the ceramic capacitor, due to the Poisson effect. Thus, this expansion is offset by the shrinkage of the first and second external electrodes 131 and 132, and thus vibration generated at the head portion of the first and second external electrodes 131 and 132 is reduced, and resultantly, acoustic noise may be further reduced.

In addition, the piezoelectric member 125, a high-dielectric material having a higher dielectric constant than the dielectric layer 111, may be formed by changing the kinds and amounts of additives in a ceramic powder constituting the dielectric layer.

When these piezoelectric members 125 are formed, firing conditions therefor need to be appropriately controlled so as to prevent occurrence of non-firing or delamination.

While these piezoelectric members 125 connect the first and second internal electrodes 121 and 122 and the first and second dummy electrodes 123 and 124, respectively, they expand in the contrary direction to shrinkage in a length direction in head portions of the first and second external electrodes 131 and 132 when voltage is applied thereto, and thus this expansion is offset by the shrinkage of the first and second external electrodes 131 and 132, thereby reducing vibration generated at the head portion of the first and second external electrodes 131 and 132, and resultantly, further reducing acoustic noise.

The first and second external electrodes 131 and 132 may be formed of a conductive paste containing conductive metal. The conductive metal may be nickel (Ni), copper (Cu), palladium (Pd), gold (Au), or an alloy thereof, but the present invention is not limited thereto.

Figure 3:
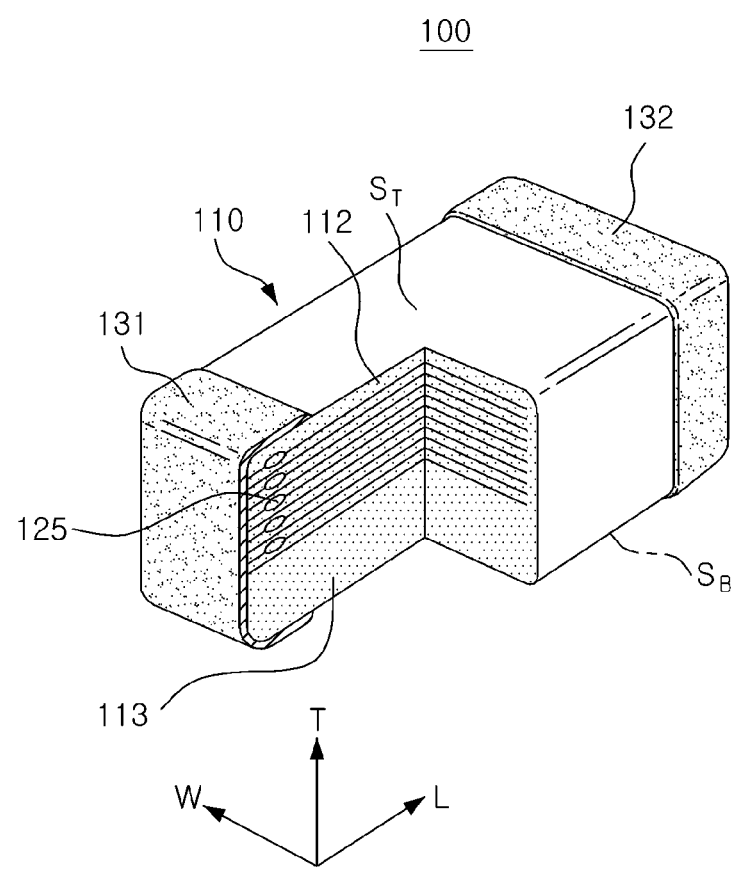
FIG. 3 is a partially cutaway perspective view schematically showing a multilayered ceramic capacitor according to a second embodiment of the present invention.
Figure 4:
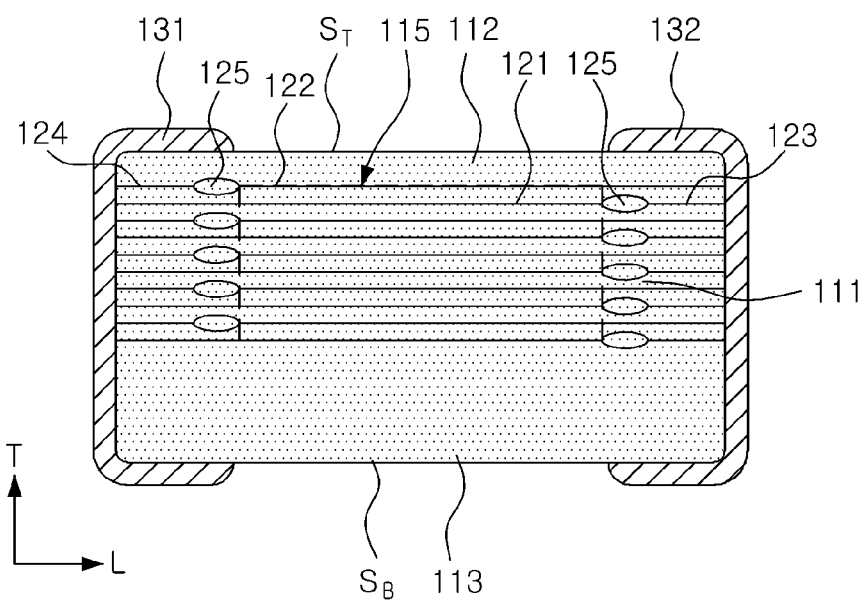
FIG. 4 is a cross-sectional view showing the multilayered ceramic capacitor of FIG. 3, cut in the length direction thereof.

FIGS. 3 and 4 show a multilayered ceramic capacitor 100 according to a second embodiment of the present invention, in which a lower cover layer 113 has a greater thickness than an upper cover layer 112.

Here, the upper and lower cover layers 112 and 113 may have the same material and configuration as those of the dielectric layer 111, except for that internal electrodes are included therein.

Referring to FIGS. 3 and 4, the upper and lower cover layers 112 and 113 may be formed by laminating a single dielectric layer or two or more dielectric layers on upper and lower surfaces of the active layer 115 in a thickness direction, respectively. The upper and lower cover layers 112 and 113 may basically serve to prevent damage of the first and second internal electrodes 121 and 122 due to physical or chemical stress.

In addition, the lower cover layer 113 may have a greater thickness than that of the upper cover layer 112 by further increasing the number of laminations of dielectric layers in the lower cover layer 113 as compared with the upper cover layer 112.

Hereinafter, the relationship between dimensions of components included in the multilayered ceramic capacitor 100 according to the second embodiment of the invention and acoustic noise will be described.

Figure 5:
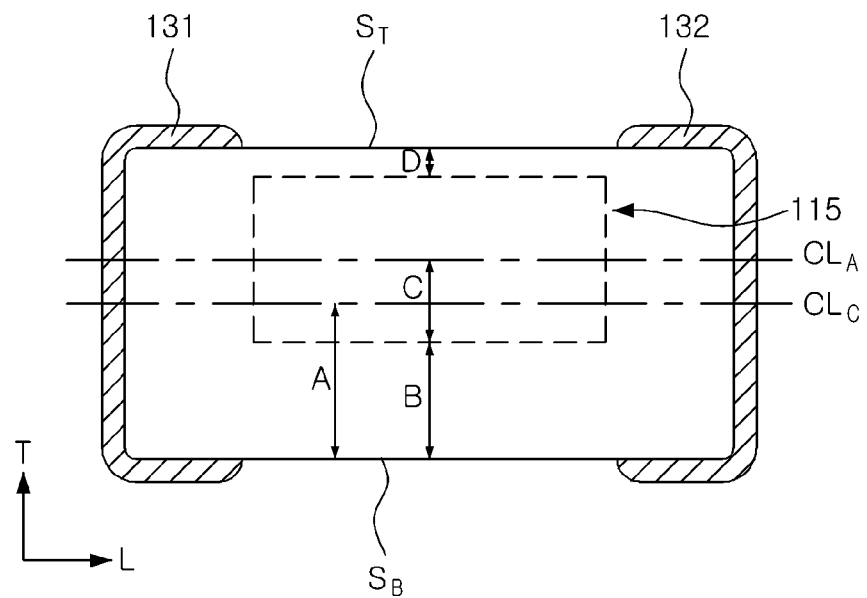
FIG. 5 is a cross-sectional view schematically showing the multilayered ceramic capacitor of FIG. 3, cut in the length direction thereof, to illustrate dimensional relationships among components included in the multilayered ceramic capacitor.

Referring to FIG. 5, 1/2 of an overall thickness of the ceramic body 110 is designated as A, a thickness of the lower cover layer 113 is designated as B, 1/2 of an overall thickness of the active layer 115 is designated as C, and a thickness of the upper cover layer 112 is designated as D.

Here, the overall thickness of the ceramic body 110 refers to a distance from a top surface ($S_T$) to a bottom surface ($S_B$) of the ceramic body 110. The overall thickness of the active layer 115 refers to a distance from an upper surface of the first internal electrode 121 located at the uppermost part of the active layer 115 to a lower surface of the second internal electrode 122 located at the lowermost part of the active layer 115.

In addition, the thickness (B) of the lower cover layer 113 refers to a distance between a lower surface of the second internal electrode 122 located at the lowermost part of the active layer 115 in the thickness direction of the active layer 115 to the bottom surface ($S_B$) of the ceramic body 110, and the thickness (D) of the upper cover layer 112 refers to a distance between an upper surface of the first internal electrode 121 located at the uppermost part of the active layer 115 in the thickness direction of the active layer 115 to the top surface ($S_T$) of the ceramic body 110.

When a voltage having different polarities is applied to the first and second external electrodes 131 and 132 formed at both end parts of the multilayered ceramic capacitor 100, the ceramic body 110 expands and shrinks in the thickness direction thereof due to an inverse piezoelectric effect of the dielectric layers 111, and both end parts of the first and second external electrodes 131 and 132 in the length direction of the ceramic body 110 expand and shrink, in a contrary direction to the expansion and shrinkage in the thickness direction of the ceramic body 110, due to the Poisson effect.

Here, a center of the active layer 115 corresponds to portions of both end parts of the first and second external electrodes 131 and 132 in the length direction thereof in which relatively maximum expansion and shrinkage occur therein, and this becomes a factor causing acoustic noise.

That is, in the present embodiment, in order to reduce acoustic noise, a point of inflection (PI) formed on both end surfaces of the ceramic body 110 due to a difference between a deformation rate occurring in a center ($CL_A$) of the active layer 115 and a deformation rate occurring in the lower cover layer 113 may be formed at a height thereof corresponding to or lower than a center ($CL_C$) of the ceramic body 110 in the thickness direction thereof, at the time of an application of voltage.

Here, in order to further reduce acoustic noise, a ratio of deviation of the center ($CL_A$) of the active layer 115 deviating from the center ($CL_C$) of the ceramic body 110, (B+C)/A, satisfies $1.064 \leq (B+C)/A \leq 1.745$.

In addition, the ratio of the thickness (D) of the upper cover layer 112 to the thickness (B) of the lower cover layer 113, D/B, may satisfy $0.021 \leq D/B \leq 0.421$.

In addition, a ration of the thickness (B) of the lower cover layer 113 to the ratio of 1/2 (A) of the thickness of the ceramic body 110, B/A, may satisfy $0.220 \leq B/A \leq 1.522$.

In addition, the ratio of 1/2 (C) of the thickness of the active layer 115 to the thickness (B) of the lower cover layer 113, C/B, may satisfy $0.147 \leq C/B \leq 3.843$.

Modification of Multilayered Ceramic Capacitor

Figure 6:
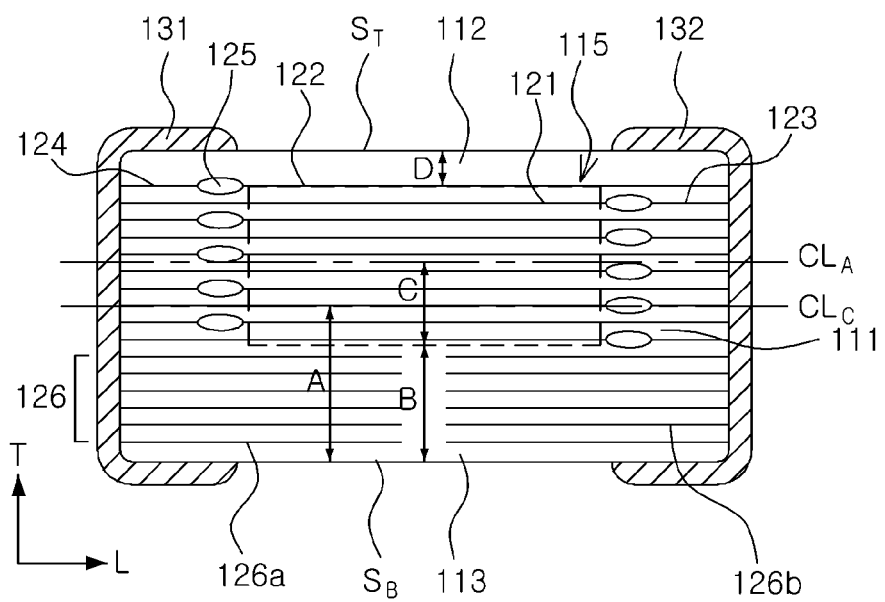
FIG. 6 is a cross-sectional view showing a multilayered ceramic capacitor according to a third embodiment of the present invention, cut in the length direction thereof.

FIG. 6 shows a multilayered ceramic capacitor according to a third embodiment of the present invention.

Here, since structures of a dielectric layer 111 of a ceramic body 110, first and second internal electrodes 121 and 122, upper and lower cover layers 112 and 113, first and second external electrodes 131 and 132, and first and second dummy electrodes 123 and 124 are similar to those of the foregoing embodiment, specific descriptions thereof will be omitted for avoid overlapping therebetween, and only the structures that are changed as compared with the foregoing embodiments will be described.

Referring to FIG. 6, a multilayered ceramic capacitor of the present embodiment may further include a plurality of dummy patterns 126 formed inside a lower cover layer 113 in a thickness direction of the ceramic body 110.

The dummy patterns 126 may include a plurality of first and second dummy patterns 126a and 126b respectively extended inwardly from the first and second external electrodes 131 and 132 in a length direction of the ceramic body 110 to thereby be opposed to each other with a predetermined interval therebetween in a thickness direction, respectively.

Here, the respective first and second dummy patterns 126a and 126b may have the same length, and form a gap formed in a thickness direction in the center of the lower cover layer 113 in the length direction of the ceramic body 110.

When the dummy patterns 126 are further formed inside the lower cover layer 113, the vibration generated in the multilayered ceramic capacitor may be effectively prevented from being transferred to the printed circuit board, and thus acoustic noise may be further reduced.

Here, the overall thickness of the dummy patterns 126 inside the lower cover layer 113 may be about 80% of the thickness of the lower cover layer 113.

Figure 7:
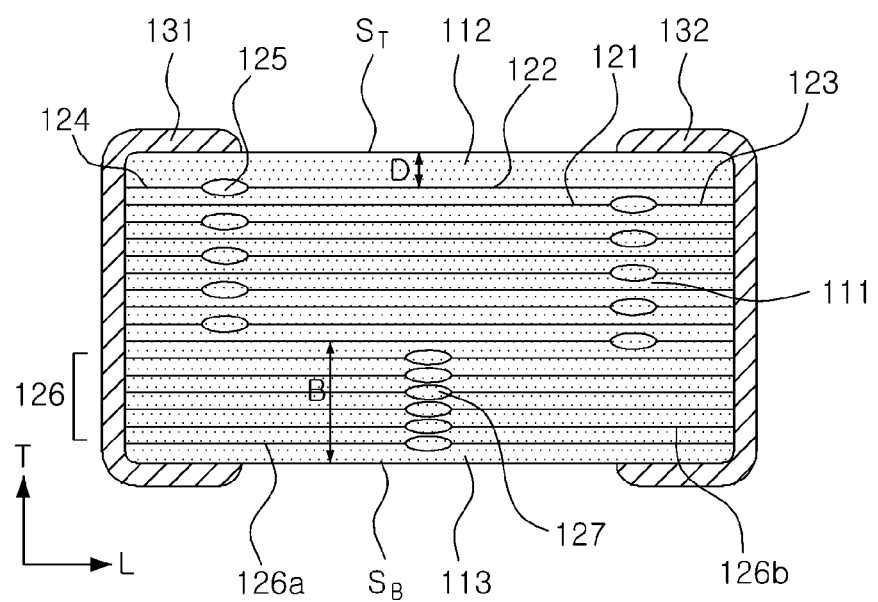
FIG. 7 is a cross-sectional view showing a multilayered ceramic capacitor according to a fourth embodiment of the present invention, cut in the length direction thereof.

FIG. 7 shows a multilayered ceramic capacitor according to a fourth embodiment of the present invention.

Here, since structures of a dielectric layer 111 of a ceramic body 110, first and second internal electrodes 121 and 122, upper and lower cover layers 112 and 113, first and second external electrodes 131 and 132, and first and second dummy electrodes 123 and 124 are similar to those of the foregoing embodiments, specific descriptions thereof will be omitted for avoid overlapping therebetween, and only the structures that are changed as compared with the foregoing embodiments will be described.

Referring to FIG. 7, a multilayered ceramic capacitor of the present embodiment may further include a plurality of dummy patterns 126 formed inside a lower cover layer 113 in a thickness direction of the ceramic body 110.

The dummy patterns 126 may include first and second dummy patterns 126a and 126b formed at a predetermined interval in a thickness direction while the plurality of first and second dummy patterns 126a and 126b are respectively extended inwardly from the first and second external electrodes 131 and 132 in a length direction to thereby be opposed to each other at a gap therebetween, respectively.

Here, each piezoelectric member 127 may be formed in the gap between the first and second dummy patterns 126a and 126b to thereby connect the first and second dummy patterns 126a and 126b to each other inside the lower cover layer 113.

The piezoelectric member 127 may be formed of a material having a higher dielectric constant or higher piezoelectricity than that of the dielectric layer constituting the lower cover layer 113, and as necessary, may be formed of the same material as that of the piezoelectric member 126 connecting the first or second internal electrode 121 or 122 and the first or the second dummy electrode 123 or 124 in the active layer 115.

When the dummy patterns 126 are further formed inside the lower cover layer 113 as described above, the vibration generated in the multilayered ceramic capacitor may be effectively prevented from being transferred to the printed circuit board, and thus acoustic noise may be further reduced.

In addition, the piezoelectric member 127 expands in the contrary direction to shrinkage at head portions of the first and second external electrodes 131 and 132 in the length direction, thereby suppressing the vibration generated at the head portions of the first and second external electrodes 131 and 132, and thus, acoustic noise may be further reduced.

Meanwhile, instead of forming the piezoelectric member 127 between the first and second dummy patterns 126a and 126b, the entire lower cover layer 113 may be formed of a material having a higher dielectric constant and higher piezoelectricity than those of the dielectric layer 111 of the ceramic body 110, that is, the same material as that of the piezoelectric member 127.

EXPERIMENTAL EXAMPLE

A multilayered ceramic capacitor according to the inventive examples and comparative examples of the present invention was manufactured as follows.

First, a slurry including a powder of, for example, barium titanate ($BaTiO_3$) powder or the like, was coated and dried on carrier films, to prepare a plurality of ceramic green sheets with a thickness of 1.8 μm.

Then, a conductive paste containing nickel for an internal electrode was coated on the ceramic green sheets by using a screen or the like, to form internal electrodes.

The ceramic green sheets were laminated in an amount of about 370 layers while the ceramic green sheets not having internal electrodes formed thereon were more laminated below than above the ceramic green sheets having internal electrodes formed thereon. This laminate was subjected to isostatic pressing at 85° C. in the pressure conditions of 1000 kgf/cm$^2$.

Then, The ceramic laminate after completion of pressing was cut into individual chips, and then the cut chip was subjected to debindering at 230° C. in the air atmosphere for 60 hours.

After that, the resultant chip was fired in the reducing atmosphere under an oxygen partial pressure of $10^{-11}$ atm to $10^{-10}$ atm, lower than the equilibrium oxygen partial pressure of Ni/NiO, such that the internal electrodes are not oxidized at 1200° C., and then, was subjected to an external electrode forming process, a plating process, and the like, to thereby manufacture a multilayer ceramic capacitor.

Here, the chip size of a multilayered chip capacitor after firing was about 1.64 mm×0.88 mm (L×W, 1068 size). Here, the tolerance was within a range of ±0.1 mm in length×width (L×W), and when the range is satisfied, acoustic noise was measured by experiments.

TABLE 1

| Sample | Dummy Electrode in Margin Part | High Dielectric Constant in Margin Part | Dummy Electrode in Lower Cover Layer | High Dielectric Constant in Lower Cover Layer | A | B | C | D | (B + C)/A | B/A | D/B | C/B | Acoustic Noise (dB) | Capacitance Implementation Ratio |
|---|---|---|---|---|---|---|---|---|---|---|---|---|---|---|
| 1 | ○ | ○ | X | X | 405.4 | 39.9 | 365.3 | 40.2 | 1.000 | 0.098 | 1.008 | 9.155 | 37.0 | OK |
| 2 | ○ | ○ | X | X | 435.9 | 70.6 | 365.7 | 69.8 | 1.001 | 0.162 | 0.989 | 5.180 | 34.1 | OK |
| 3 | ○ | ○ | X | X | 455.1 | 89.2 | 364.7 | 91.5 | 0.997 | 0.196 | 1.026 | 4.089 | 31.8 | OK |
| 4 | ○ | ○ | X | X | 508.1 | 24.7 | 361.1 | 269.2 | 0.759 | 0.049 | 10.899 | 14.619 | 39.8 | OK |
| 5 | ○ | ○ | X | X | 456.4 | 25.2 | 359.9 | 167.8 | 0.844 | 0.055 | 6.659 | 14.282 | 42.1 | OK |
| 6 | ○ | ○ | X | X | 526.9 | 30.1 | 190.8 | 642.1 | 0.419 | 0.057 | 21.332 | 6.339 | 37.5 | OK |
| 7 | ○ | ○ | X | X | 414.4 | 30.8 | 188.8 | 420.4 | 0.530 | 0.074 | 13.649 | 6.130 | 40.4 | OK |
| 8 | ○ | ○ | X | X | 516.1 | 40.3 | 360.3 | 271.3 | 0.776 | 0.078 | 6.732 | 8.940 | 35.9 | OK |
| 9 | ○ | ○ | X | X | 446.5 | 40.3 | 365.7 | 121.3 | 0.909 | 0.090 | 3.010 | 9.074 | 37.2 | OK |
| 10 | ○ | ○ | X | X | 470.1 | 42.1 | 364.6 | 168.8 | 0.865 | 0.090 | 4.010 | 8.660 | 37.1 | OK |
| 11 | ○ | ○ | X | X | 416.9 | 41.4 | 361.0 | 70.3 | 0.965 | 0.099 | 1.698 | 8.720 | 37.1 | OK |
| 12 | ○ | ○ | X | X | 428.1 | 40.8 | 359.9 | 95.5 | 0.936 | 0.095 | 2.341 | 8.821 | 36.1 | OK |
| 13 | ○ | ○ | X | X | 495.7 | 39.6 | 365.3 | 221.2 | 0.817 | 0.080 | 5.586 | 9.225 | 36.2 | OK |
| 14 | ○ | ○ | X | X | 436.6 | 25.6 | 421.5 | 4.6 | 1.024 | 0.059 | 0.180 | 16.465 | 40.0 | OK |
| 15 | ○ | ○ | X | X | 421.3 | 71.4 | 365.9 | 39.3 | 1.038 | 0.169 | 0.550 | 5.125 | 33.1 | OK |
| 16 | ○ | ○ | X | X | 431.2 | 94.7 | 363.9 | 39.9 | 1.064 | 0.220 | 0.421 | 3.843 | 27.8 | OK |
| 17 | ○ | ○ | X | X | 443.0 | 103.6 | 389.1 | 4.1 | 1.112 | 0.234 | 0.040 | 3.756 | 26.5 | OK |
| 18 | ○ | ○ | X | X | 443.9 | 120.5 | 363.1 | 41.1 | 1.089 | 0.271 | 0.341 | 3.013 | 27.8 | OK |
| 19 | ○ | ○ | X | X | 447.9 | 148.0 | 362.5 | 22.8 | 1.140 | 0.330 | 0.154 | 2.449 | 26.9 | OK |
| 20 | ○ | ○ | X | X | 453.0 | 164.7 | 360.4 | 20.5 | 1.159 | 0.364 | 0.124 | 2.188 | 23.9 | OK |
| 21 | ○ | ○ | X | X | 448.9 | 170.2 | 361.4 | 4.7 | 1.184 | 0.379 | 0.028 | 2.123 | 24.1 | OK |
| 22 | ○ | ○ | X | X | 471.2 | 171.0 | 365.6 | 40.1 | 1.139 | 0.363 | 0.235 | 2.138 | 23.7 | OK |
| 23 | ○ | ○ | X | X | 492.7 | 221.6 | 360.9 | 41.9 | 1.182 | 0.450 | 0.189 | 1.629 | 25.9 | OK |
| 24 | ○ | ○ | X | X | 500.1 | 269.8 | 360.4 | 9.6 | 1.260 | 0.539 | 0.036 | 1.336 | 22.6 | OK |
| 25 | ○ | ○ | X | X | 517.2 | 270.6 | 362.0 | 39.7 | 1.223 | 0.523 | 0.147 | 1.338 | 24.1 | OK |
| 26 | ○ | ○ | X | X | 501.7 | 365.2 | 311.8 | 14.5 | 1.350 | 0.728 | 0.040 | 0.854 | 25.0 | OK |
| 27 | ○ | ○ | X | X | 406.7 | 421.1 | 188.8 | 14.7 | 1.500 | 1.035 | 0.035 | 0.448 | 24.0 | OK |
| 28 | ○ | ○ | X | X | 445.5 | 492.8 | 179.1 | 40.0 | 1.508 | 1.106 | 0.081 | 0.363 | 25.1 | OK |

TABLE 1-continued

| Sample | Dummy Electrode in Margin Part | High Dielectric Constant in Margin Part | Dummy Electrode in Lower Cover Layer | High Dielectric Constant in Lower Cover Layer | A | B | C | D | (B + C)/A | B/A | D/B | C/B | Acoustic Noise (dB) | Capacitance Implementation Ratio |
|---|---|---|---|---|---|---|---|---|---|---|---|---|---|---|
| 29 | ○ | ○ | X | X | 484.6 | 632.4 | 160.7 | 15.3 | 1.637 | 1.305 | 0.024 | 0.254 | 24.1 | OK |
| 30 | ○ | ○ | X | X | 519.4 | 642.4 | 190.6 | 15.1 | 1.604 | 1.237 | 0.024 | 0.297 | 21.3 | OK |
| 31 | ○ | ○ | X | X | 486.0 | 684.2 | 121.1 | 45.5 | 1.657 | 1.408 | 0.067 | 0.177 | 22.8 | OK |
| 32 | ○ | ○ | X | X | 507.9 | 743.6 | 120.8 | 30.5 | 1.702 | 1.464 | 0.041 | 0.162 | 24.7 | OK |
| 33 | ○ | ○ | X | X | 516.1 | 775.4 | 118.3 | 20.1 | 1.732 | 1.503 | 0.026 | 0.153 | 25.9 | OK |
| 34 | ○ | ○ | X | X | 523.6 | 797.1 | 116.8 | 16.5 | 1.745 | 1.522 | 0.021 | 0.147 | 23.8 | OK |
| 35 | ○ | ○ | X | X | 532.6 | 831.5 | 109.4 | 14.8 | 1.767 | 1.561 | 0.018 | 0.132 | 23.7 | NG |
| 36 | ○ | ○ | X | X | 533.7 | 842.1 | 105.1 | 15.0 | 1.775 | 1.578 | 0.018 | 0.125 | 23.6 | NG |
| 37 | ○ | ○ | X | X | 534.3 | 850.3 | 101.2 | 15.8 | 1.781 | 1.592 | 0.019 | 0.119 | 25.7 | NG |
| 38 | X | X | X | X | 405.1 | 40.0 | 365.1 | 40.0 | 1.000 | 0.099 | 1.000 | 9.128 | 43.8 | OK |
| 39 | X | X | X | X | 448.2 | 147.9 | 363.2 | 22.0 | 1.140 | 0.330 | 0.149 | 2.456 | 32.4 | OK |
| 40 | X | X | X | X | 515.1 | 268.4 | 360.8 | 40.2 | 1.222 | 0.521 | 0.150 | 1.344 | 31.2 | OK |
| 41 | ○ | ○ | ○ | X | 448.8 | 148.0 | 363.7 | 22.1 | 1.140 | 0.330 | 0.149 | 2.457 | 23.5 | OK |
| 42 | ○ | ○ | ○ | X | 515.7 | 268.8 | 361.2 | 40.1 | 1.222 | 0.521 | 0.149 | 1.344 | 21.4 | OK |
| 43 | ○ | ○ | ○ | ○ | 449.1 | 147.9 | 364.1 | 22.0 | 1.140 | 0.329 | 0.149 | 2.462 | 20.1 | OK |
| 44 | ○ | ○ | ○ | ○ | 515.4 | 269.1 | 360.9 | 39.9 | 1.222 | 0.522 | 0.148 | 1.341 | 18.3 | OK |
| 45 | ○ | X | X | X | 404.8 | 40.2 | 364.7 | 39.9 | 1.000 | 0.099 | 0.993 | 9.072 | 40.4 | OK |

Table 1 above shows dimension data of respective parts of the multilayered ceramic capacitor 100, measured based on an image obtained by scanning a cross-section of the ceramic body 110, which is cut in the length direction (L) and thickness direction (T) at the central portion in the width direction (W) of the ceramic body 110 of the multilayered ceramic capacitor 100, using a scanning electron microscope (SEM), as shown in FIG. 5.

Here, as described above, 1/2 of an overall thickness of the ceramic body 110 was designated as A, a thickness of the lower cover layer 113 was designated as B, 1/2 of an overall thickness of the active layer 115 was designated as C, and a thickness of the upper cover layer 112 was designated as D.

In order to measure acoustic noise, one sample (multilayered ceramic capacitor) per substrate for measurement of acoustic noise was mounted on a printed circuit board while upper and lower directions of the sample were differentiated from each other, and then the printed circuit board was seated on a measuring jig.

In addition, DC voltage and voltage variation were applied to both terminals of the sample seated on the measuring jig by using a DC power supply and a function generator.

In addition, acoustic noise was measured through a microphone installed directly on the printed circuit board.

In Table 1 above, Sample 38 is a comparative example having a cover symmetrical structure in which the thickness (B) of the lower cover layer 113 is equal to the thickness (D) of the upper cover layer 112 and the dummy electrodes 123 and 124 and the piezoelectric members 125 are not formed in the active layer 115.

Here, the acoustic noise value 43.8 Db in Sample 38 is a standard for comparison between other comparative examples and inventive examples described later.

Sample 45 is a comparative example having a symmetrical structure with respect to covers in which the thickness (B) of the lower cover layer 113 is equal to the thickness (D) of the upper cover layer 112, and the dummy electrodes 123 and 124 are formed but the piezoelectric members 125 are not formed in the active layer 115. It can be confirmed that the acoustic noise value was slightly reduced to 40.4 dB when compared with Sample 38, but still indicated a relatively high value.

Samples 1 to 3 are inventive examples for the first embodiment of the invention, having a symmetrical structure with respect to covers in which the thickness (B) of the lower cover layer 113 is similar to the thickness (D) of the upper cover layer 112, and the dummy electrodes 123 and 124 and the piezoelectric members 125 are formed in the active layer 115.

Here, the acoustic noise value of Sample 1 was 37.0 dB, which was reduced to 40 dB or lower when compared with Samples 38 and 45.

In addition, it can be seen that, when the thicknesses of the upper and lower cover layers 112 and 113 were increased at the same ratio as compared with Sample 1, the acoustic noise values for Samples 2 and 3 were 34.1 dB and 31.8 dB, respectively, which were further reduced as compared with Sample 1.

Samples 4 to 13 are comparative examples having a structure in which the thickness (D) of the upper cover layer 112 is thicker than the thickness (B) of the lower cover layer 113 and dimensional relationships between components included in the multilayered ceramic capacitor deviate from numerical ranges according to the embodiment of the present invention.

Samples 16 to 34 are inventive examples having a structure in which the thickness (B) of the lower cover layer 113 is thicker than the thickness (D) of the upper cover layer 112 according to the second embodiment of the invention; dimensional relationships between components included in the multilayered ceramic capacitor satisfy all numerical ranges according to the embodiment of the present invention; and the dummy electrodes 123 and 124 and the piezoelectric members 125 are formed in the active layer 115.

When the (B+C)/A value is almost 1, it may indicate that the center of the active layer 115 is not significantly deviated from the center of the ceramic body 110.

In Samples 1 to 3 and 38 having a symmetrical structure with respect to covers in which the thickness (B) of the lower cover layer 113 is equal to or almost similar to the thickness (D) of the upper cover layer 112, the (B+C)/A values thereof are 1 or approximately 1.

In addition, in a case in which the (B+C)/A value is greater than 1, it may indicate that the center of the active layer 115 is upwardly deviated from the center of the ceramic body 110. When the (B+C)/A value is smaller than 1, it may indicate that the center of the active layer 115 is downwardly deviated from the center of the ceramic body 110.

In addition, in Samples 16 to 37 in which the ratio of deviation of the center of the active layer 115 from the center of the ceramic body 110, the (B+C)/A value, satisfies 1.064≤(B+C)/A, it can be confirmed that acoustic noise values therefor were significantly reduced to below 30 dB.

In addition, Samples 1 to 15 in which the ratio of deviation of the center of the active layer 115 from the center of the ceramic body 110, the (B+C)/A value, is below 1.064, have a structure in which the center of the active layer 115 is scarcely deviated from the center of the ceramic body 110 or the center of the active layer 115 is downwardly deviated from the center of the ceramic body 110.

Here, it can be confirmed that Samples 1 to 15 in which the (B+C)/A values are below 1.064 have acoustic noise values of 30 dB or higher, which were still higher as compared with Samples 16 to 37.

Meanwhile, it can be confirmed that, in Samples 35 to 37 in which the ratio of deviation of the center of the active layer 115 from the center of the ceramic body 110, the (B+C)/A value, is above 1.745, the acoustic noise value was significantly reduced to 30 dB or lower, but the capacitance to target capacitance was low, causing defective capacitance.

The expression "NG" marked in the capacitance implementation ratio of Samples 35 to 37 (that is, the ratio of capacitance to target capacitance) refers to defective capacitance in which a value of capacitance to target capacitance is below 80% when the target capacitance value is 100%.

Therefore, it can be seen that, when the satisfied numerical range of the ratio of deviation of the center of the active layer 115 from the center of the ceramic body 110, that is, the (B+C)/A value, is 1.064≤(B+C)/A≤1.745.

Samples 39 and 40 are comparative examples having a structure in which the thickness (B) of the lower cover layer 113 is thicker than the thickness (D) of the upper cover layer 112, and numerical relationships between components included in the multilayered ceramic capacitor satisfy all numerical ranges of the present invention but the dummy electrodes 123 and 124 and the piezoelectric members 125 are not formed in the active layer 115, and it can be seen that the acoustic noise values thereof were 30 dB or higher, which was still higher as compared with Samples 16 to 37.

Meanwhile, it can be seen that, in the case of inventive examples in which the acoustic noise values were reduced to 30 dB or lower, the ratio of the thickness (D) of the upper cover layer 112 to the thickness (B) of the lower cover layer 113, D/B, satisfies D/B≤0.421.

Whereas, it can be seen that, in the case of comparative examples (Samples 1 to 15) in which the ratio of the thickness (D) of the upper cover layer 112 to the thickness (B) of the lower cover layer 113, D/B, is above 0.421, the acoustic noise values were still high.

Particularly, Sample 15 of which the D/B value is 0.550, deviating from the numerical range of the present invention, has a structure in which the thickness (B) of the lower cover layer 113 is thicker than the thickness (D) of the upper cover layer 112, but the acoustic noise thereof was 33.1 dB, and thus the acoustic noise reduction effect was not great.

In addition, in the case of Samples 35 to 37 in which the ratio of the thickness (D) of the upper cover layer 112 to the thickness (B) of the lower cover layer 113, D/B, is below 0.021, the thickness (B) of the lower cover layer 113 is excessively greater than the thickness (D) of the upper cover layer 112, and thus crack or delamination may occur, and the capacitance to target capacitance may be low, causing defective capacitance.

Therefore, it can be confirmed that, the satisfied numerical range of the ratio of the thickness (D) of the upper cover layer 112 to the thickness (B) of the lower cover layer 113, D/B, may be 0.021≤D/B≤0.421.

In addition, it can be seen that, in the case of Inventive Examples of which the acoustic noise values were reduced to 30 dB or lower, the ratio of the thickness (B) of the lower cover layer 113 to the thickness (A) of the ceramic body 110, B/A, and the ratio of the thickness (C) of the active layer 115 to the thickness (B) of the lower cover layer 113, C/B, satisfy, 0.220≤B/A≤1.522 and 0.147≤C/B≤3.843, respectively.

Whereas, it can be seen that, in the case of Samples 35 to 37 in which the capacitance to target capacitance was low, causing defective capacitance, the ratio of the thickness (B) of the lower cover layer 113 to the thickness (A) of the ceramic body 110, B/A, is above 1.522 and the ratio of the thickness (C) of active layer 115 to the thickness (B) of the lower cover layer 113, C/B, is below 0.147.

Particularly, it can be seen that, Sample 14 of which the B/A value is 0.059 and the C/B value is 16.465, deviating from the numerical range of the present invention, has a structure in which the thickness (B) of the lower cover layer 113 is thicker than the thickness (D) of the upper cover layer 112, but the acoustic noise value thereof was 40.0 dB, and thus the acoustic noise reduction effect was little.

It can be confirmed that, Samples 41 and 42 are inventive examples according to the third embodiment of the invention, having a structure in which the dummy patterns 126 are further formed in the lower cover layer 113 of the second embodiment of the invention, and the acoustic noise values therefor were 23.5 dB and 21.4 dB, respectively, and the acoustic noise reduction effect was excellent as compared with the second embodiment of the invention (Samples 16 to 34) in which the dummy electrodes 123 and 124 and the piezoelectric members 125 are formed in the active layer 115.

It can be confirmed that, Samples 43 and 44 are inventive examples according to the fourth embodiment of the invention, having a structure in which the piezoelectric members 127 are further formed in the dummy patterns 126 in the lower cover layer 113 of the third embodiment of the invention, and the acoustic noise values therefor were 20.1 dB and 18.3 dB, respectively, and the acoustic noise reduction effect was excellent as compared with the third embodiment of invention (Samples 41 and 42) in which the dummy electrodes 123 and 124 and the piezoelectric members 125 are formed in the active layer 115 and only the dummy patterns 126 are formed in the lower cover layer 113.

Figure 8:
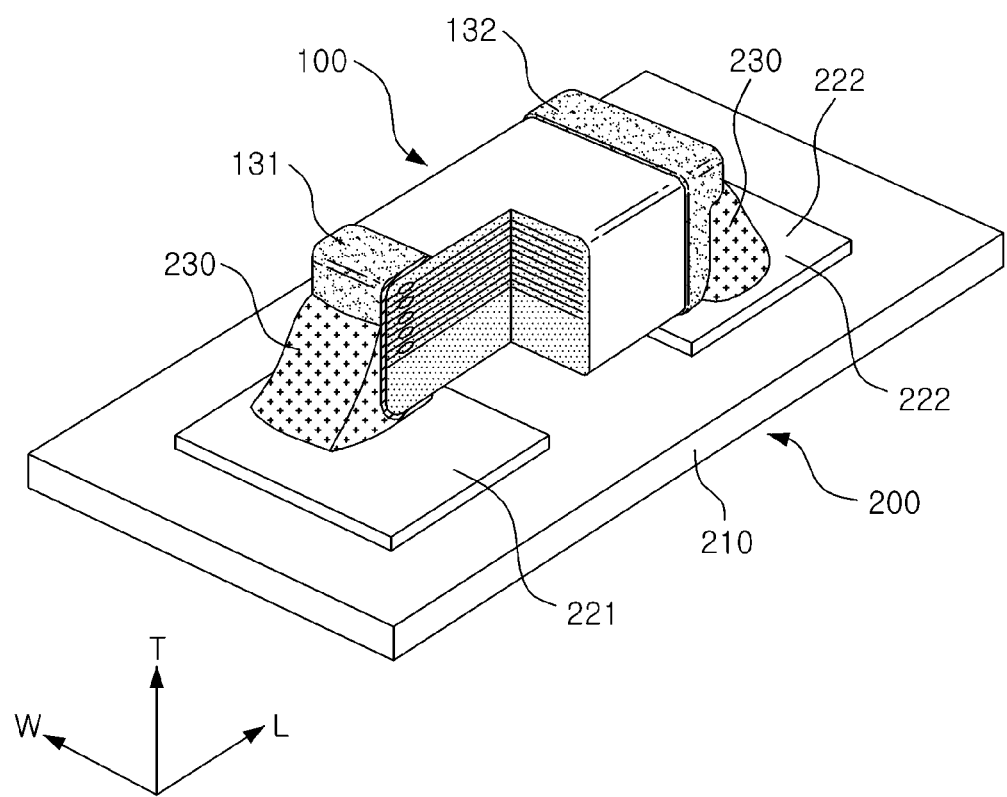
FIG. 8 is a perspective view showing a state in which the multilayered ceramic capacitor according to the second embodiment of the present invention is mounted on a printed circuit board.
Figure 9:
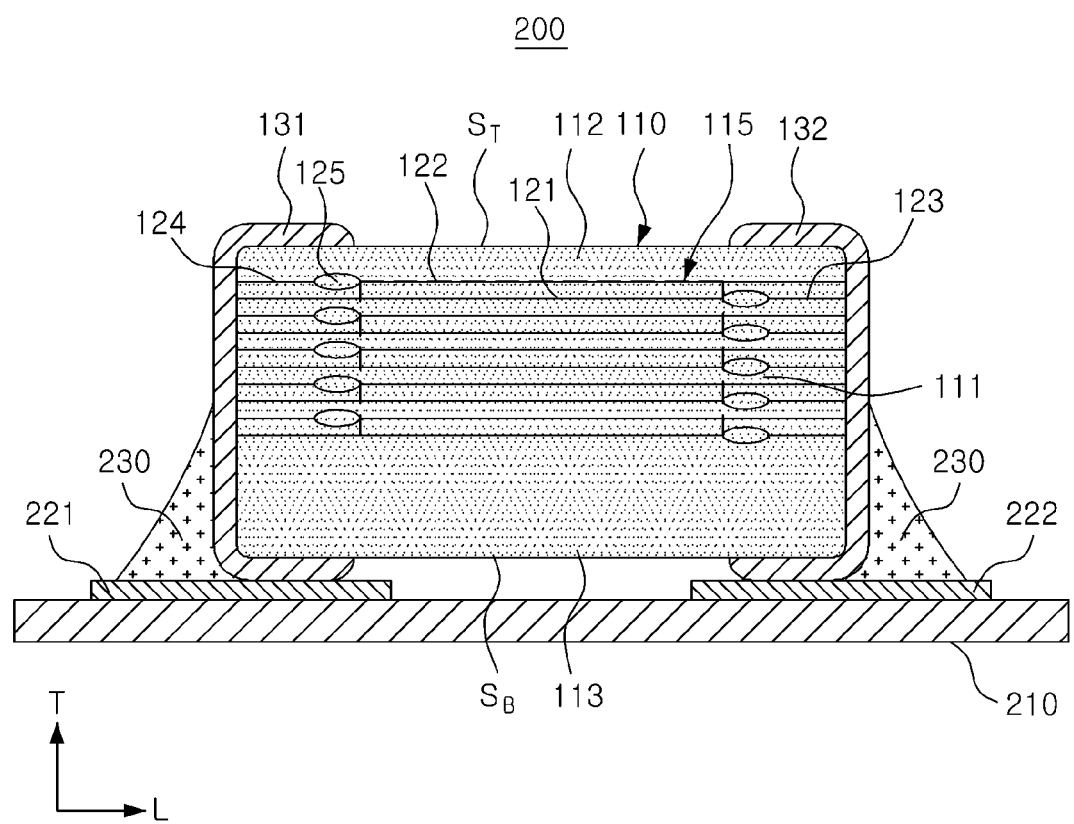
FIG. 9 is a cross-sectional view showing the multilayered ceramic capacitor and printed circuit board of FIG. 8, cut in the length direction thereof.

Mounting Structure of Circuit Board Having Multilayered Ceramic Capacitor Mounted Thereon Referring to FIGS. 8 and 9, a mounting board 200 for the multilayered ceramic capacitor 100 according to the present embodiment may include a printed circuit board 210 on which the multilayered ceramic capacitor 100 is horizontally mounted; and first and second electrode pads 221 and 222 spaced apart from each other on an upper surface of the printed circuit board 210.

The multilayered ceramic capacitor 100 of the second embodiment of the invention as described above is applied in the present embodiment, but the present invention is not limited thereto. Certainly, all the multilayered ceramic capacitors that have structures changed in the claims of the present invention, as well as the first, third, and fourth embodiments of the invention, may be also applied.

The multilayered ceramic capacitor 100 may be electrically connected with the printed circuit board 210 by soldering 230 while the lower cover layer 113 is located on a lower part thereof and the first and second external electrodes 131 and 132 are positioned on and contacted with the first and second electrode pads 221 and 222, respectively.

When voltage is applied while the multilayered ceramic capacitor 100 is mounted on the printed circuit board 210 as described above, acoustic noise may be generated.

Here, the size of the first and second electrode pads 221 and 222 may be an index for determining the amount of soldering 230 which connects between the first and second external electrodes 131 and 132 of the multilayered ceramic capacitor 100 and the first and second electrode pads 221 and 222, and the level of acoustic noise may be controlled depending on the amount of soldering 230.

Figure 10:
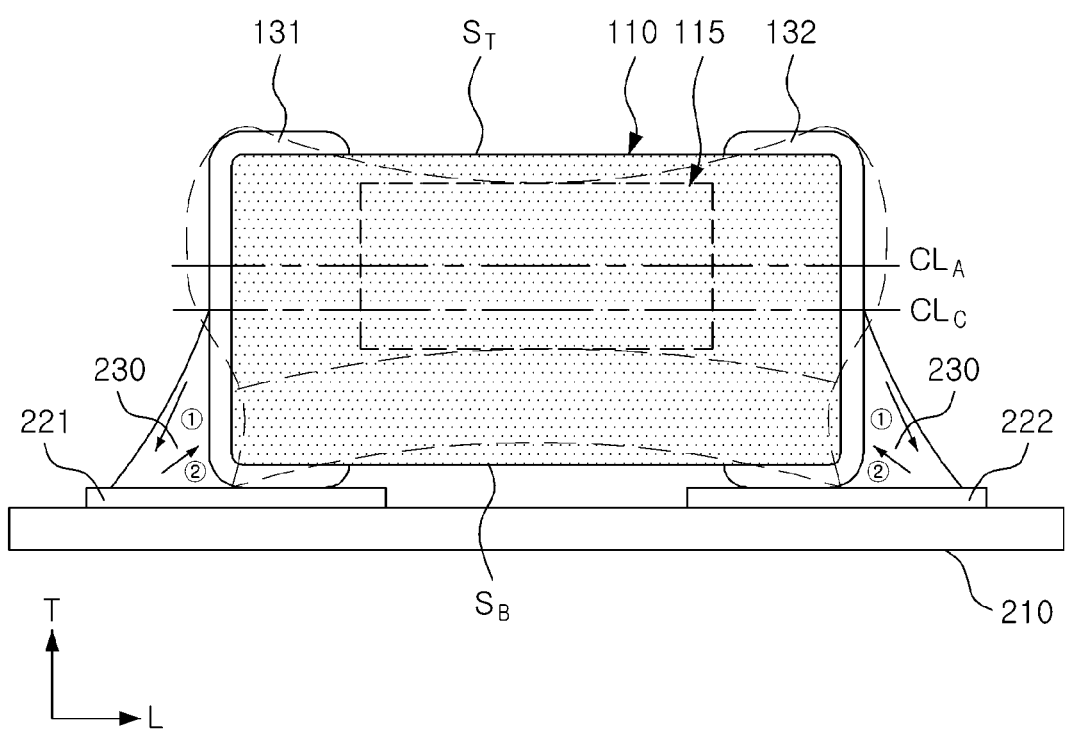
FIG. 10 is a cross-sectional view schematically showing a state in which the multilayered ceramic capacitor according to the second embodiment of the present invention is transformed by application of voltage while the multilayered ceramic capacitor is mounted on the printed circuit board.

Referring to FIG. 10, when a voltage having different polarities is applied to the first and second external electrodes 131 and 132 formed at both end parts of the multilayered ceramic capacitor 100 while the multilayered ceramic capacitor 100 is mounted on the printed circuit board 210, the ceramic body 110 expands and shrinks in the thickness direction thereof due to an inverse piezoelectric effect of the dielectric layers 111, and both ends of the first and second external electrodes 131 and 132 in the length direction thereof expand and shrink, in a contrary direction to expansion and shrinkage in the thickness direction of the ceramic body 110, due to the Poisson effect.

Here, a center of the active layer 115 corresponds to portions of both end parts of the first and second external electrodes 131 and 132 in the length direction thereof in which relatively maximum expansion and shrinkage occur therein, and this becomes a factor causing acoustic noise.

When both end surfaces in the length direction of the multilayered ceramic capacitor 100 significantly expands, a force (①) of allowing an upper portion of the soldering 230 to be pushed out to the outside is generated due to expansion, and a shrinkage force (②) of allowing a lower portion of the soldering 230 to be pushed to the external electrode is generated due to the force (①).

Therefore, when a point of inflection formed in both end surfaces of the ceramic body 110 is formed at a height corresponding to or lower than that of the soldering 230 due to a difference between a deformation rate occurring in a center ($CL_A$) of the active layer 115 and a deformation rate occurring in the lower cover layer 113, at the time of an application of voltage, acoustic noise may be further reduced.

Here, when an electric field is applied to a margin part of the multilayered ceramic capacitor in a length direction, the first and second dummy electrodes 123 and 124 expand in the contrary direction to shrinkage on the head portion of the first and second external electrodes 131 and 132 in the length direction of the ceramic body, due to the Poisson effect. Thus, this expansion is offset by the shrinkage of the first and second external electrodes 131 and 132, and thus vibration generated at the head portion of the first and second external electrodes 131 and 132 is reduced, and resultantly, acoustic noise may be further reduced.

In addition, the piezoelectric members 125 connecting the first and second internal electrodes 121 and 122 and the first and second dummy electrodes 123 and 124, respectively, expand in the contrary direction to shrinkage in the length direction on the head portion of the first and second external electrodes 131 and 132, and thus this expansion is offset by the shrinkage of the first and second external electrodes 131 and 132, thereby reducing vibration generated at the head portion of the first and second external electrodes 131 and 132, and resultantly, further reducing acoustic noise.

As set forth above, according to the embodiments of the invention, the piezoelectric members connecting the internal electrodes and the dummy electrodes are formed inside the active layer, thereby suppressing vibration generated from the multilayered ceramic capacitor by expansion of the piezoelectric members in a length direction thereof, and thus acoustic noise generated from the printed circuit board may be significantly reduced.

While the present invention has been shown and described in connection with the embodiments, it will be apparent to those skilled in the art that modifications and variations may be made without departing from the spirit and scope of the invention as defined by the appended claims.

What is claimed is:

1. A multilayered ceramic capacitor, comprising:
a ceramic body having a plurality of dielectric layers laminated therein;
an active layer including a plurality of first and second internal electrodes alternately exposed through both end surfaces of the ceramic body while having the dielectric layer interposed therebetween, to thereby form capacitance;
upper and lower cover layers formed above and below the active layer, respectively;
first and second external electrodes covering both end surfaces of the ceramic body;
a plurality of first and second dummy electrodes extended from the first and second external electrodes toward an inner portion in a length direction to thereby be opposed to the first and second internal electrodes, respectively, inside the active layer; and
a plurality of piezoelectric members connecting the first internal electrode and the first dummy electrode or the second internal electrode and the second dummy electrode, respectively, inside the active layer, the piezoelectric members having a higher dielectric constant than the dielectric layer.

2. The multilayered ceramic capacitor of claim 1, wherein the piezoelectric members are formed both between the first internal electrode and the first dummy electrode and between the second internal electrode and the second dummy electrode.

3. The multilayered ceramic capacitor of claim 1, wherein the lower cover layer is thicker than the upper cover layer, and
wherein, when 1/2 of an overall thickness of the ceramic body is designated as A, a thickness of the lower cover layer is designated as B, 1/2 of an overall thickness of the active layer is designated as C, and a thickness of the upper cover layer is designated as D, a ratio of deviation of a center of the active layer deviating from a center of the ceramic body, (B+C)/A, satisfies $1.064 \leq (B+C)/A \leq 1.745$.

4. The multilayered ceramic capacitor of claim 3, wherein a ratio of the thickness (D) of the upper cover layer to the thickness (B) of the lower cover layer, D/B, satisfies $0.021 \leq D/B \leq 0.421$.

5. The multilayered ceramic capacitor of claim 3, wherein a ratio of the thickness (B) of the lower cover layer to 1/2 (A) of the thickness of the ceramic body, B/A, satisfies $0.220 \leq B/A \leq 1.522$.

6. The multilayered ceramic capacitor of claim 3, wherein a ratio of 1/2 (C) of the thickness of the active layer to the thickness (B) of the lower cover layer, C/B, satisfies $0.147 \leq C/B \leq 3.843$.

7. The multilayered ceramic capacitor of claim 3, wherein the lower cover layer includes dummy patterns, the dummy patterns including first and second dummy patterns extended inwardly from the first and second external electrodes in the length direction to thereby be opposed to each other, respectively.

8. The multilayered ceramic capacitor of claim 7, wherein the first and second dummy patterns have the same length.

9. The multilayered ceramic capacitor of claim 7, further comprising piezoelectric members connecting the first and second dummy patterns to each other inside the lower cover layer, the piezoelectric members having a higher dielectric constant than the dielectric layer of the lower cover layer.

10. The multilayered ceramic capacitor of claim 7, wherein the lower cover layer is formed of a material having a higher dielectric constant than that of the dielectric layer of the ceramic body.

11. The multilayered ceramic capacitor of claim 3, wherein a point of inflection formed in both end surfaces of the ceramic body is formed at a height corresponding to or lower than a center of the thickness of the ceramic body, due to a difference between a deformation rate occurring in a center of the active layer and a deformation rate occurring in the lower cover layer, at the time of an application of voltage.

12. A mounting structure of a circuit board having a multilayered ceramic capacitor mounted thereon, the mounting structure comprising:
  a printed circuit board having first and second electrode pads formed thereon; and
  a multilayered ceramic capacitor mounted on the printed circuit board,
  wherein the multilayered ceramic capacitor includes: a ceramic body having a plurality of dielectric layers laminated therein; an active layer including a plurality of first and second internal electrodes alternately exposed through both end surfaces of the ceramic body while having the dielectric layer interposed therebetween, to thereby form capacitance; an upper cover layer formed above the active layer; a lower cover layer formed below the active layer; first and second external electrodes formed on both end surfaces of the ceramic body while being electrically connected with exposed portions of the first and second internal electrodes and soldering-connected with the first and second electrode pads; a plurality of first and second dummy electrodes extended from the first and second external electrodes toward an inner portion in a length direction to thereby be opposed to the first and second internal electrodes, respectively, inside the active layer; and a plurality of piezoelectric members connecting the first internal electrode and the first dummy electrode or the second internal electrode and the second dummy electrode, respectively, inside the active layer, the piezoelectric members having a higher dielectric constant than the dielectric layer, and
  wherein, when 1/2 of an overall thickness of the ceramic body is designated as A, a thickness of the lower cover layer is designated as B, 1/2 of an overall thickness of the active layer is designated as C, and a thickness of the upper cover layer is designated as D, a ratio of deviation of a center of the active layer deviating from a center of the ceramic body, $(B+C)/A$, satisfies $1.064 \leq (B+C)/A \leq 1.745$.

13. The mounting structure of claim 12, wherein the lower cover layer includes dummy patterns, the dummy patterns including first and second dummy patterns extended inwardly from the first and second external electrodes in the length direction to thereby be opposed to each other, respectively.

14. The mounting structure of claim 13, further comprising piezoelectric members connecting the first and second dummy patterns to each other inside the lower cover layer, the piezoelectric members having a higher dielectric constant than that of the dielectric layer of the lower cover layer.

15. The mounting structure of claim 12, wherein a point of inflection formed in both end surfaces of the ceramic body is formed at a height corresponding to or lower than that of the soldering, due to a difference between a deformation rate occurring in a center of the active layer and a deformation rate occurring in the lower cover layer, at the time of an application of voltage.

* * * * *